R. H. WAPPLER.
ENDOSCOPE.
APPLICATION FILED DEC. 27, 1909.
1,001,787.
Patented Aug. 29, 1911.
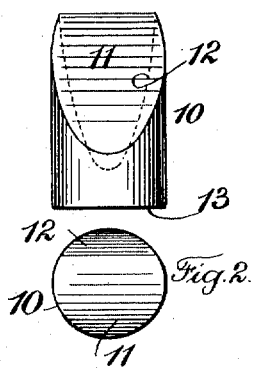
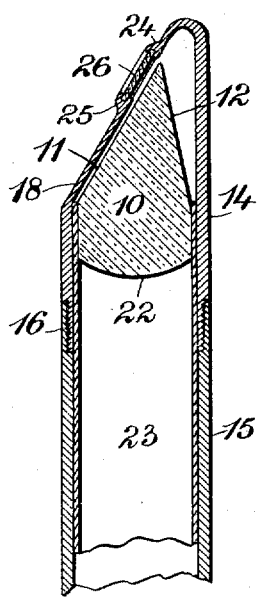
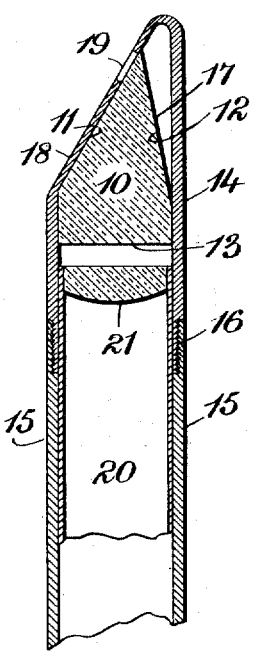
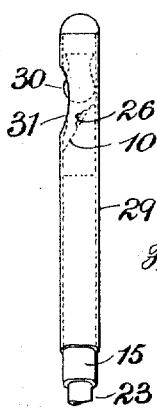
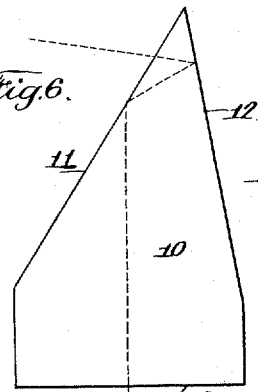
Witnesses
Chas H Smith
A. L. Serrell
Inventor
Reinhold H. Wappler.
by Harold Serrell
his Atty.
COLUMBIA PLANOGRAPH CO., WASHINGTON, D. C.

UNITED STATES PATENT OFFICE.

REINHOLD H. WAPPLER, OF NEW YORK, N. Y., ASSIGNOR TO AMERICAN CYSTOSCOPE MAKERS INC., OF NEW YORK, N. Y., A CORPORATION OF NEW YORK.

ENDOSCOPE.

1,001,787.   Specification of Letters Patent.   Patented Aug. 29, 1911.

Application filed December 27, 1909. Serial No. 534,988.

*To all whom it may concern:*

Be it known that I, REINHOLD H. WAPPLER, a citizen of the United States, residing in the borough of Manhattan, city, county, and State of New York, have invented an Improvement in Endoscopes, of which the following is a specification.

Heretofore in the use of endoscopes in the diagnosis of certain diseases, difficulty has been experienced in examining the walls of small passages or ducts into which the instrument is inserted, due to the fact that the tissue forming the walls of these small passages, has a tendency to hug the instrument so closely as to leave insufficient space or distance between the walls to be examined and the front lens of the instrument to permit a good view of the walls being obtained.

Now the object of my invention is to overcome this difficulty and in so doing, the extremity or tip of the endoscope made according to my invention, is so constructed as to allow ample space between the front lens of the instrument and the exterior limits thereof, to provide for the necessary distance between the walls of the passage to be examined and this front lens of the instrument, to permit a good view of the walls being obtained,—as will be hereinafter more particularly described.

In the drawings, Figure 1 is an elevation of a lens employed in my improved endoscope. Fig. 2 is a plan view of the same. Fig. 3 is a central longitudinal section of the end portion of an endoscope illustrating my present invention. Fig. 4 is a view similar to Fig. 3, showing a modification of the invention. Fig. 5 is a view similar to Figs. 3 and 4, showing a further modification of the invention. Fig. 6 is an elevation of the end of the sheath in which the endoscope is adapted to be inserted for use, showing the endoscope in dotted lines in position therein, and Fig. 7 is a diagrammatic view illustrating the way in which the rays of light are refracted and reflected in passing through the prismatic lens employed in the instrument made in accordance with my present invention.

Referring to the drawings, particularly to Figs. 1 and 2, I prefer to employ a lens indicated at 10. This lens is made of any suitable material and the body portion thereof is preferably cylindrical. In this lens adjacent to one end, there is a plane face indicated at 11, preferably cut at an angle of approximately 30° to the axis of the lens and at the same end and on the opposite side, the lens is provided with a face 12, also a plane face, which is cut preferably at an angle of approximately 10° to the axis of the lens. As illustrated in these figures, the opposite end of the lens is preferably a plane face indicated at 13.

Referring to Fig. 3, the lens 10 hereinbefore described is mounted in the tip member 14 of an endoscope which is secured to the casing 15 of the endoscope by the screw threaded connection 16 or otherwise, and in this instance, the face 12 is preferably provided with a coating 17 of mercury or other similar material to provide the so called silvered surface and produce a positive reflecting effect.

On one side, the tip member 14 is provided with an inclined portion indicated at 18, extending entirely or approximately so, across the tip member 14 at an angle corresponding to the angle at which the face 11 is cut in the lens 10. In this inclined portion 18 of the tip member and adjacent to the extremity thereof, there is provided an aperture indicated at 19, for the admission of the light.

It will be understood that the lens 10 may be secured in any desired manner in the tip member 14 and when in position, that the face 11 thereof lies against or in close proximity to the other surface of the inclined portion 18 of the tip member. This face 11 of the lens 10 extends entirely across the aperture 19 and appreciably beyond the outer edge thereof. In this form of the endoscope constructed in accordance with my invention, I prefer to employ an inner tube or sleeve indicated at 20. At the end of this sleeve an object glass 21 is secured in any desired manner and the sleeve 20 is of such a diameter as to be inserted in the casing 15 and the tip member 14 and to be slidably adjustable therein and removable therefrom.

By referring to Fig. 4, as will be manifest, the lens 10 instead of being provided with a plane surface 13 at the end thereof as indicated in Figs. 1 and 2, this end of the lens 10 may be a convex surface 22, whereby the object glass is confined in the lens 10. In this structure, the lens 10 is secured in any desired manner in a sleeve or tube 23 adapted to be received in the tip member 14 and the casing 15 to be slidably adjustable therein and to be removable therefrom, the tip member 14 of the casing 15 being connected in this instance in the same manner as that shown and described in connection with Fig. 3.

In the construction shown in Fig. 4, the inclined portion of the tip member 14 is provided with a flange 24 surrounding the aperture therein which corresponds to the aperture 19 in the construction shown in Fig. 3, and in this flange 24 there is a circular recess or groove 25 adapted to receive a plate of glass indicated at 26, which parts are so connected as to form a water-tight joint. In this structure manifestly, it is not necessary to silver either of the surfaces 11 or 12 of the lens 10.

By referring to Fig. 5, instead of providing the inclined portion 18 of the tip member 14 with a flange 24 as indicated in Fig. 4, I may provide the same with an internal flange 27 placed at an inclination to the inclined portion 18 and also to the axis of the instrument and within this flange 27 I prefer to set in any desired manner a lens 28. In this case the lens 10 is similar in construction and the manner in which it is mounted to that hereinbefore described in connection with Fig. 4.

In Fig. 6, 29 designates the sheath such as is commonly employed in the use of the instruments to which my present invention relates. In the end of the sheath as is customary, a lamp bulb 30 is secured and adjacent to the lamp bulb 30, the sheath 29 is provided with a more or less elongated opening shown at 31, a portion of which at least extends considerably beyond the end of the lamp bulb 30. When inserted in the sheath 29 and in place therein, the endoscope assumes such a position that the aperture 19 or the glass 26 or the lens 28 comes beneath the opening 31 and is adjacent to the extremity of the lamp bulb 30. It will now be apparent that even though the walls of the tube, duct, or other part or organ being examined with the instrument, hug the walls of the instrument ever so closely, there will still be a certain distance between the edges of the opening 31 and the aperture 19, or the glass 26, or the lens 28, and this distance is sufficient to obtain a satisfactory view of the walls of the part to be examined. It will also be apparent that in entering the lens 10, the rays of light will first be refracted from the face 11 to the face 12, from which they are reflected to the face 11 and then again reflected through the other lenses of the instrument, and that in this double reflection, a rectified or right sided image of the object viewed is obtained.

By referring to Fig. 7, it will be seen that in passing through the prismatic lens 10, the rays of light are first refracted from the face 11 to a silvered face 12, from which they are reflected back to the face 11, from which by virtue of the manner in which the lens is mounted,—being entirely inclosed,—the rays of light are reflected and pass through the face 13 or the face 22, thence from the lens.

For clearness I have shown only the central ray of light by a dotted line.

I claim as my invention:

1. An endoscope comprising a casing, a tip therefor provided with an oblique portion adjacent to the extremity of the tip, in which oblique portion there is provided an aperture, a lens mounted in the said tip and provided with a face cut at substantially the same angle to the axis of the lens as the said oblique portion of the tip is to the axis of the instrument, another face cut on the said lens at a smaller angle to the axis than the aforesaid face thereof, the first aforesaid face lying adjacent to and extending entirely across the said aperture.

2. An endoscope comprising a casing, a tip therefor provided with an oblique portion adjacent to the extremity of the tip, in which oblique portion there is provided an aperture, a lens mounted in the said tip and provided with a face cut at substantially the same angle to the axis of the lens as the said oblique portion of the tip is to the axis of the instrument, another face lying adjacent and cut on the said lens at a smaller angle to the axis than the aforesaid face thereof, the first aforesaid face extending entirely across the said aperture, and a glass set in the said aperture in the oblique portion of the said tip.

3. An endoscope comprising a casing, a tip therefor provided with an oblique portion adjacent to the extremity of the tip, in which oblique portion there is provided an aperture, a lens mounted in the said tip and provided with a face cut at substantially the same angle to the axis of the lens as the said oblique portion of the tip is to the axis of the instrument, another face cut on the said lens at a smaller angle to the axis than the aforesaid face thereof, the first aforesaid face extending entirely across the said aperture, and a front lens set in the said aperture in the oblique portion of the said tip.

4. An endoscope comprising a casing, a tip therefor provided with an oblique portion adjacent to the extremity of the tip, in which oblique portion there is provided an aperture, a sleeve adapted to fit within the said tip and casing and to be removable therefrom, a lens mounted in said sleeve and provided with a face cut at substantially the same angle to the axis of the lens as the said oblique portion of the tip is to the axis of the instrument, another face cut in the said lens at a smaller angle to the axis than the aforesaid face thereof, the first aforesaid face extending entirely across the said aperture.

5. An endoscope comprising a casing, a tip therefor provided with an oblique portion adjacent to the extremity of the tip, in which oblique portion there is provided an aperture, a sleeve adapted to fit within said tip and casing and to be removable therefrom, a lens mounted in said sleeve and provided with a face cut at substantially the same angle to the axis of the lens as the said oblique portion of the tip is to the axis of the instrument, another face cut on the said lens at a smaller angle to the axis than the aforesaid face thereof, the first aforesaid face extending entirely across the said aperture, and a glass set in the said aperture in the oblique portion of the said tip.

Signed by me this 15th day of December, 1909.

REINHOLD H. WAPPLER.

Witnesses:
GEO. T. PINCKNEY,
BERTHA M. ALLEN.

Copies of this patent may be obtained for five cents each, by addressing the "Commissioner of Patents, Washington, D. C."